United States Patent [19]
Taylor et al.

[11] Patent Number: 5,125,690
[45] Date of Patent: Jun. 30, 1992

[54] PIPE JOINING SYSTEM AND METHOD

[75] Inventors: James M. Taylor, Mountain View; Larry A. Walter; Peter A. Barton, both of Fremont, all of Calif.

[73] Assignee: Metcal, Inc., Menlo Park, Calif.

[21] Appl. No.: 451,179

[22] Filed: Dec. 15, 1989

[51] Int. Cl.⁵ .............................. F16L 47/02
[52] U.S. Cl. ........................ 285/21; 285/22; 285/292; 156/308.2; 156/379; 219/535; 219/544
[58] Field of Search ............ 285/21, 260, 292, 22; 219/535, 544, 548; 156/272.4, 308.2, 379.7

[56] References Cited

U.S. PATENT DOCUMENTS

| | | |
|---|---|---|
| 3,353,849 | 11/1967 | Laurizio .............................. 285/21 |
| 4,256,945 | 3/1981 | Carter et al. |
| 4,695,335 | 9/1987 | Lyall ........................ 156/379.7 X |
| 4,695,713 | 9/1987 | Krumme |
| 4,701,587 | 10/1987 | Carter et al. |
| 4,745,264 | 5/1988 | Carter |
| 4,814,587 | 3/1989 | Carter |

FOREIGN PATENT DOCUMENTS

WO80/02124 10/1980 PCT Int'l Appl.
8402098 6/1984 PCT Int'l Appl.

Primary Examiner—Randolph A. Reese
Assistant Examiner—Heather Chun
Attorney, Agent, or Firm—Howard L. Rose

[57] ABSTRACT

In a plastic pipe joining system a plastic sleeve is provided to extend on both sides beyond the region of contact or closest approach to one another of pipes to be joined with the sleeve being fused to both pipes, the sleeve heated to Curie temperature of high mu material excited by an externally generated high frequency magnetic field. The heater may be embedded in the sleeve and the sleeve may also be employed with end caps that extended over the sleeve, the end caps and sleeve being fused to one another and the pipes by heaters carried by the end caps or the sleeve. An external heater may also be employed which in conjuction with shaped end members provides the sleeve with beveled or tapered edges to enhance the ability of the sleeve to withstand cracking.

28 Claims, 2 Drawing Sheets

PIPE JOINING SYSTEM AND METHOD

TECHNICAL FIELD

The present invention relates to an induction fusion pipe joining system and method and more particularly to such a system and method for joining plastic pipes employing temperature self regulating heaters.

BACKGROUND OF THE INVENTION

Of the roughly 25,000 miles of gas distribution piping installed by the United States gas distribution industry in 1988, approximately 23,000 was plastic pipe and more specifically polyethylene pipe.

This increasing popularity of polyethylene pipe is due to its reduced installation cost, ease of joining, light weight and resistance to corrosion. While most existing methods for joining polyethylene pipe have a very good reputation for reliability, there is still a degree of craft sensitivity which requires very skilled workers and extensive training. Even with this training, a certain percentage of bad joints are made due to environmental conditions, equipment problems, installer errors or just bad luck.

While this percentage is fortunately very small, every leak, especially a major rupture is potentially very dangerous and most leaks cost a great deal to repair. Any reduction in craft sensitivity and increase in reliability would reduce the operating cost of the gas distribution system and increase its overall safety.

The recent development of electrofusion fittings for joining polyethylene pipe is a step in the right direction toward reducing the need for extensive fusion training and for reducing the cost of repairs and tie-ins. These electrofusion systems, due to the nature of their relatively complex design, are still very expensive and have a number of performance issues that limit their ultimate general acceptance. In the meantime, Butt fusion, socket fusion and mechanical fittings are still widely used.

When done correctly with proper times, temperatures and pressures, butt fusion using CAL ROD resistance heaters or the like works very well. Over the past 20 years, millions of butt fusion joints have been made with a low percentage of problems. However, every gas utility company has their horror stories of catastrophes where a series of bad butt welds created major problems and expense.

As to socket fusion, many of the comments on craft sensitivity and required training apply to this form of fusion joining as well.

The heater irons employed in socket fusion take a long time to heat up and if proper allowances aren't made for ambient temperature or if the installer is too slow between heating and pressing together, a bad joint is still likely. If the pipe is not fully inserted into the socket, the fitting and section of pipe must be cut out often wasting hours of work.

Mechanical fittings are used typically from ½" to 1¼" pipes. They are usually much more expensive than socket fusion fittings, but can be quickly installed with a hand tool, thus saving labor expense. A number of different systems can be found on the market and their reputations for reliability vary from gas company to gas company.

Returning to electrofusion, it has been extremely popular in England and France, but has been slow to take off in the U.S. gas industry. It has made the most significant inroads for repairs and tie-ins and should begin to enjoy growth in branch and saddle situations and line extensions.

Electrofusion systems require much less training to install than the other systems discussed which is a major advantage as is their ability to be installed in cramped conditions where other fusion methods are very difficult. A number of shortcomings however, have prevented the rapid acceptance of this process such as it is still very expensive, and it is sensitive to pipe orientation, especially gaps between the ends of the pipes. These gaps remove material from under the sections of the heating coil adjacent to these gaps, causing the heating wires to overheat the plastic. The plastic in these regions is overheated and may flow causing the heater wires to contact one another and thus short out or crowd together and produce still additional hot spots. In a worst case this can cause a fire or explosion. For these reasons the more sophisticated power supplies for these systems have elaborate methods of shutting off the power to the coil if a problem is detected. If this happens the fitting and any other pipe or piping components it is attached to must be cut out and scrapped. This procedure is extremely expensive and time consuming. A number of different approaches have been proposed to overcome these problems, such as temperature control and the use of clamps on each pipe with a rigid bar extending between the clamps. There is still concern that eventually a leak might develop out along the continuous wires of the heater coil, especially if the wires have overheated.

A problem that is inherent in each of the prior art systems discussed above is that a continuous fusion of the plastics does not occur over unbroken extended regions of contact of the sleeve and pipes. In consequence there are numerous inclusions that can and often do cause nucleation of cracking leading to expensive repairs particularly where the pipes are buried underground.

BRIEF DESCRIPTION OF THE PRESENT INVENTION

In accordance with the present invention, a sleeve is disposed over the adjacent ends of two pipes to be joined and a temperature self regulating heater is employed to fuse the sleeve to the pipes. The heater which relies on Curie point control to regulate temperature, may take many forms and may be located on the outside surface or interiorly on the sleeve or on surfaces of members cooperating with the sleeve. In one specific configuration arcuate heater(s) may touch the circumference of the pipes but only under very special conditions. The Curie temperature of the heaters employed are selected in accordance with the materials to be fused and are excited by the alternating magnetic field produced by a coil disposed about the outside of the sleeve. In certain embodiments of the invention the sleeve is caused to expand in such a way that a shear is developed between surfaces of the pipes and sleeve and breaks up oxidation that has formed on the various surfaces to be joined. The end surface of the pipes may still have to be roughed-up. In this context, in one embodiment of the invention, a corrugated heater is embedded in the sleeve in a circumferential manner to produce circumferential pressure points that move outwardly thus enhancing the drag to clean the surfaces to be joined.

It is to be noted that with the use of a Curie point controlled self regulating heater overtemperature cannot be developed if a constant current supply is employed so that even if different regions of the heater are brought into contact with one another as a result of movement of the plastic, overheating does not occur.

The particular feature of the Curie temperature heater that is useful in this context is its ability to adjust to incremental changes along the body of the heater. If a region is too cool the heater in that region falls below Curie temperature and the heat energy delivered to that region is increased. An adjacent region may be up to Curie temperature and thus the heat energy delivered to that region is low; the magnetic permeability of the heater at any given region being a function of the temperature at that region.

In one preferred embodiment of the invention, the sleeve is used in conjunction with a pair of members that fit over the ends of the sleeve and at their ends are turned radially inward and contact the members to be joined. The heaters are carried by the cylindrical inner surfaces of the end members or the outer cylindrical surfaces of the sleeve. In such arrangements, there is provided the ability to select heaters of the same or different temperatures whereby pipes or other bodies to be joined may be of different materials having different fusion temperatures. The only constraint on different fusion temperatures is that the sleeve, which may be made from two different materials is neither overheated nor underheated but such constraints permit the use of a wide range of temperatures and thus a wide range of materials. The ability to accommodate two different temperatures is also available where the heaters are embedded in the sleeve since the Curie points of the high mu materials on opposite sides of a joint may also be different.

The heaters employed herein may be a high mu material only or a combination of a high mu material with a copper layer or layer of another good conductor, see U.S. Pat. No. 4,256,945; high mu material with a second layer of high mu material, see U.S. Pat. No. 4,695,713 and a sandwich of high mu material, copper, and a second high mu material, see U.S. Pat. No. 4,752,673. Induction heating is disclosed in U.S. Pat. No. 4,839,501. The disclosures of these patents are incorporated herein by reference. There is currently a disagreement between experts in the field as to whether copper in contact with polyethylene will or will not produce chain scission in the latter. Thus to be on the safe side the copper is used as the filler in hollow rings or has a flat strip heater folded about it or is otherwise isolated from the plastic by a very thin layer of Kapton or the like.

In another embodiment of the invention, the heater is disposed about the outside of the sleeve and is configured such that as a result of flow of the plastic the external surface of the finished product conforms to a desired shape, such as a bevel to lessen the problem of cracking of the pipe at the interfaces between the pipes and the sleeves.

The heater material may be continuous or discontinuous in some instances consisting of individual rings or bands embedded in the plastic sleeve or a thin continuous layer embedded in the sleeve or disposed on the inner surface of the end caps or outer surface of the sleeve adjacent the end caps. In the embodiment employing end caps, the heaters are preferably of this latter type.

The present invention may also be employed to add a T-section to a pipe system, the sleeve having a side arm or more than one side arm at the junction of two or more pipes. In an extreme case six pipes all at 90° or 180° to one another can be joined. The invention may use more than one layer of heaters to provide uniform heat in thick sleeves or to cause fusion between different layers of the sleeve employed. The heaters provide additional burst strength to the sleeve which may be further reinforced by multiple layers of heaters, glass fibers or mats, adhesives and the like.

The heaters employed herein are supplied with a constant current, which term is defined by the equation:

$$\frac{\Delta |I|}{I} < -\frac{1}{2} \frac{\Delta |R|}{R}$$

where I and R are current and resistance respectively. If there is no change in current as magnetic permeability changes then temperature regulation is good. If the current does increase, temperature regulation occurs but becomes poorer as the value of the left side of the equation approaches the value of the right side of the equation.

The Curie temperature employed in these devices is not necessarily the absolute Curie temperature but the temperature at which the high mu material approaches paramagnetism to the extent necessary to achieve the purposes of this invention. Such temperature which is called herein the "effective Curie temperature" may be as little as 1° or as great as 100° different from absolute Curie temperature depending upon the material.

The high mu materials employed may be ferromagnetic, ferrimagnetic or other materials that change magnetic permeability with temperature, all depending upon physical, magnetic, resistivity and economic considerations in a particular application.

Although this invention grew out of work related to joining of natural gas conveying pipes, it is applicable to joining plastic pipes, or rods or other plastic articles in general. Further, articles that are of regular shapes such as ellipses, squares, rectangles, etc. and in some instance irregular shapes may also be joined by the system of the present invention.

OBJECTS OF THE INVENTION

It is an object of the present invention to provide an efficient and inexpensive system for joining plastic pipes and other plastic articles.

It is yet another object of the present invention to provide a sleeve that extends well beyond the joint of two plastic pipes whereby to provide extended unbroken regions of fusion between the sleeve and the pipes.

Still another object of the present invention is to provide a method and apparatus for joining plastic objects which materially reduces problems of cracking inherent in the systems.

It is yet another object of the present invention to provide a system for joining plastic articles wherein it is not necessary to remove oxidation before joining.

DETAILED DESCRIPTION OF THE INVENTION

Figure 1:
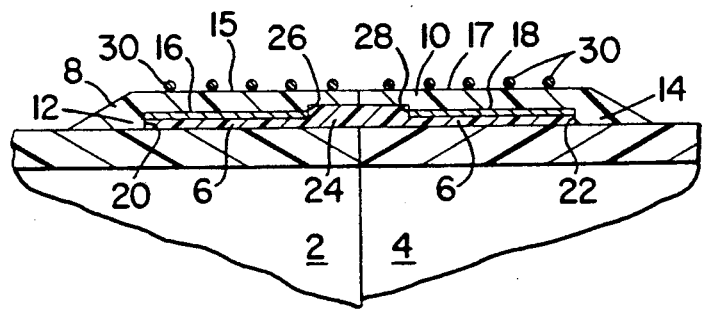
FIG. 1 illustrates a first embodiment of the present invention employing a sleeve and end caps.

Referring specifically to FIG. 1 of the accompanying drawings pipes 2 and 4 which may be of the same or different plastic materials are bridged by a plastic sleeve 6 that is to be fused to both pipes. Prior to placing the sleeve 6 on the pipes, an end cap 8 is slid over pipe 2 and an end cap 10 is slid over the pipe 4. The end caps 8 and 10 are hollow cylindrical plastic members having inwardly directed flanges 12 and 14, respectively, of inner diameter such that each fits snugly about its respective pipe. The main body of each end cap 8 and 10 is a hollow cylindrical extension 15 or 17, respectively, extending toward the pipe joint. Heaters 16 and 18 are secured, deposited or otherwise disposed on or in contact with the inner surfaces of the extensions 15 and 17, respectively.

Returning to the sleeve 6, it extends usually equal distances to either side of the joint between the pipes. Shoulders 20 and 22 formed by the flanges 12 and 14, respectively, engage the left and right ends, respectively, of the sleeve 6. The sleeve 6 may be provided with a circumferential ridge 24, rectangular in cross-section, disposed equally on both sides of the joint between the pipes. If the ridge 24 is employed it engages radial shoulders 26 and 28 provided on the inner surface of the end cap so that all regions of engagement of the sleeve 6 and end caps 12 and 14 are provided with positive positioning and contact relative to one another.

In operation, the end caps 12 and 14 are placed on their respective pipes and the pipes brought into contact with one another within the center of the sleeve 6. A coil 30 is connected across a source of alternating current, preferably a current of a constant RMS. Eddy current and hysteresis losses as well as $I^2R$ losses are generated in the heaters 16 and 18 to cause them to heat to a temperature approaching the respective Curie temperatures, which may or may not be the same depending upon system configuration. The materials are all fused together, the end caps to the sleeve 6 and the pipes 2 and 4 and the sleeve to the pipes 2 and 4. With proper heating and positioning of the pipes 2 and 4, the end surfaces of the pipes may also fuse to one another. In this configuration as in the others disclosed herein, long unbroken fused regions are provided by the sleeve 6.

As previously indicated the pipes 2 and 4 may be of different materials that may not fuse to one another but both must be fusible to the sleeve 6. By extending the heater into the ends of the end caps the pipes may be bonded each to its associated end cap 12 or 14. The Curie temperature of the heaters 16 and 18 may also be different if the fusion temperatures of the pipes are materially different.

In the above description, it is assumed that the various members of the pipe joining system are assembled in the field. In fact the preferred approach and current intent is to assemble sleeve 6 and the end caps at the factory so that the skill required of the worker in the field is not necessarily very high. In accordance with this method it is only necessary in the field to insert pipes to be joined into opposite ends of the fitting and heat by a clam-shell type coil arrangement.

Figure 2:
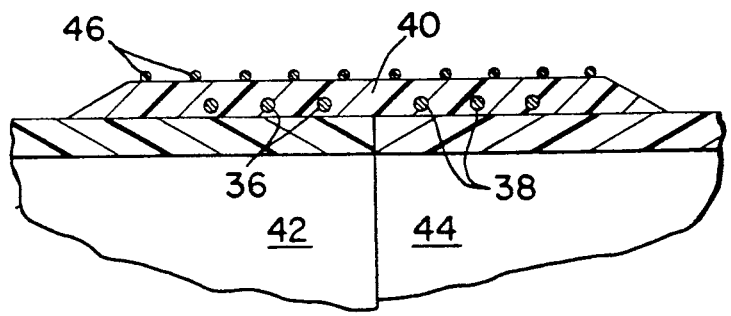
FIG. 2 illustrates the use of a sleeve with embedded ring heaters for joining two pipes.

Referring now specifically to FIG. 2 of the accompanying drawings, there is illustrated a second embodiment of the present invention. In this embodiment a set of circumferential rings 36, three illustrated, and another set of circumferential rings 38, also three illustrated, are disposed in a sleeve 40 on opposite sides of a joint to be made between pipes 42 and 44, respectively. The two sets of rings are fabricated from a high mu material which may be the same material or materials having different Curie temperatures for the same reasons as set forth in the discussion of FIG. 1. The rings may be copper or the like coated with a high mu material and are embedded in a sleeve 40 of an appropriate plastic so that when the sleeve is located over the joint between abutting pipes to be joined, the plastic may be rapidly heated by a coil 46 applied about the sleeve 40 to induce currents, etc. in the rings 36 and 38. Whenever reference is made to an external coil a clam-shell type coil arrangement may be employed.

The effective Curie temperature of the high mu materials are in all embodiments of the invention chosen to produce fusion of the plastics involved without reaching temperatures that will damage the plastics.

Figure 3:
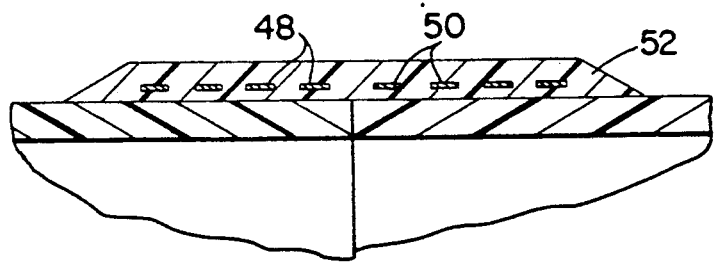
FIG. 3 illustrates a modification of FIG. 2 using band heaters.

Referring now specifically to FIG. 3 of the accompanying drawings there is illustrated an embodiment quite similar to the embodiment of FIG. 2 but employing two sets of independent bands 48 and 50 of high mu material rather than rings. The bands are embedded in a plastic sleeve 52 and give more uniform heating than the rings and therefore are preferred. Again the Curie temperature of the two sets of bands may be different.

Figure 4:
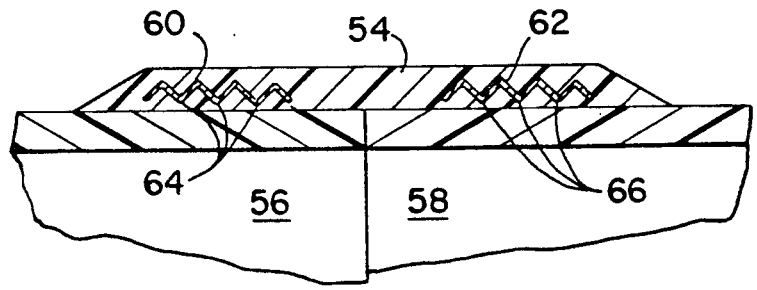
FIG. 4 illustrates the use of a corrugated heater in a plastic sleeve.

Referring now specifically to FIG. 4 of the accompanying drawings, there is illustrated a plastic sleeve 54 spanning the joint between two pipes 56 and 58 to be joined. Two corrugated heaters 60 and 62 are embedded in the sleeve 54 equally spaced on opposite sides of the joint between the pipes 56 and 58. The corrugations of each heater are axially spaced and extend circumferentially around the pipes whereby low points 64 and 66 of heaters 60 and 62, respectively, provide circumferentially extending ridges that closely approach the outer surfaces of the pipes 56 and 58.

Upon expansion of the sleeve 54 during heating, the ridges 64 and 66 provide a strong shearing force on the surfaces of the pipes whereby to enhance break-up of the oxidation layer on such surfaces. All of the sleeves accomplish this function but not to as great an extent as the embodiment of FIG. 4. Again heating is achieved by the use of an external coil although in this embodiment and others employing an axially continuous heater, wires may be ohmically connected so that skin effect heating may be employed by flow of constant current through the heater. The use of a coil eliminates the need for external connections to the heaters and thus is preferred.

Figure 5:
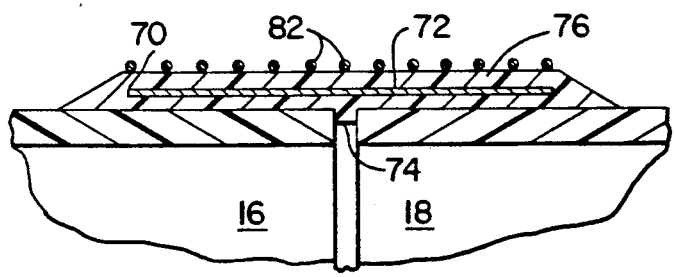
FIG. 5 illustrates the use of a single axially elongated heater.

Reference is now made to FIG. 5 of the accompanying drawings wherein is illustrated a plastic sleeve 70 having an elongated annular heater 72 incorporated therein. The sleeve has an annular inwardly projecting rectangular ridge 74 which provides positive seating of pipes 76 and 78 which are to be joined via the sleeve 70. The pipes 76 and 78 are inserted into the sleeve 70 and brought into abutment with the ridge 74 and then a coil 82 is energized. The heater is heated by coil 82 to a temperature approaching its effective Curie temperature and the sleeve 70 and ridge 74 are fused to the pipes 76 and 78. A ridge such as ridge 74 may be employed in any of the embodiments of the present invention.

All of the embodiments discussed above, except the embodiment of FIG. 1 have employed heaters embedded in the plastic sleeve. Even in FIG. 1 the heaters, after fusion of the end caps to the sleeve, end up buried in the middle of the fused plastics and as such are also not reusable. External heaters may also be employed as illustrated in FIGS. 6 through 8 and may be reusable.

Figure 6:
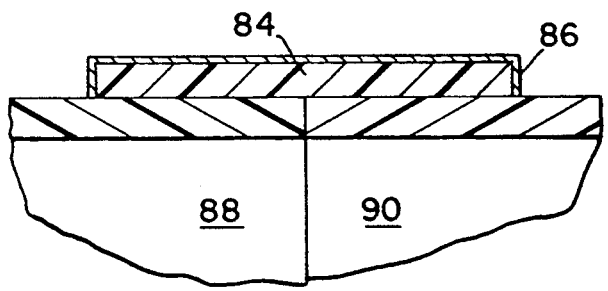
FIG. 6 illustrates the use of an external heater.

Referring specifically to FIG. 6 of the accompanying drawings, there is illustrated a sleeve 84 having a heater 86 surrounding its circumferential surface and the edges thereof. The heater 86 may be adapted to remain on the sleeve 84 after completion of the process or may be adapted to be removed.

In operation the heater 86, which may be inductively coupled or ohmically connected, is heated to its effective Curie temperature which is above the fusion temperature of the plastics employed. Upon the heater obtaining effective Curie temperature, the sleeve 84 is fused to pipes 88 and 90.

Figure 7:
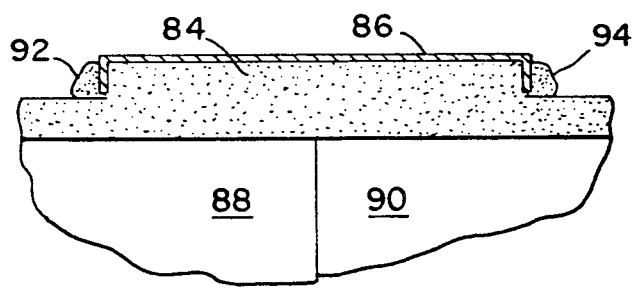
FIG. 7 illustrates a joint resulting from use of the heater of FIG. 6.
Figure 8:
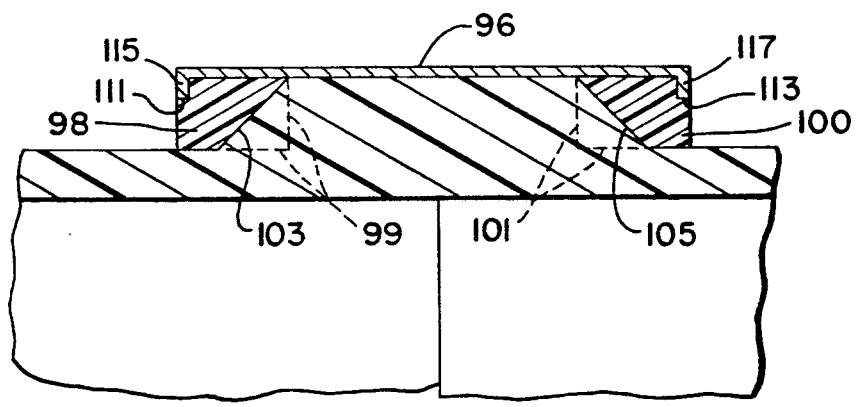
FIG. 8. illustrates a modified heater structure for forming beveled edges at the axial ends of a sleeve.

Due to expansion of the plastic of the sleeve 84, and reference is made to FIG. 7 of the accompanying drawings, plastic flows out from under the edges of the sides of the heater creating beads 92 and 94 of plastic. This outflow of plastic is put to use by the use of shaped rings in conjunction with a modified heater to provide the configuration of FIG. 8 of the accompanying drawings.

As illustrated in FIG. 8 of the accompanying drawings, two rings 98 and 100, are fitted one at each end of sleeve 84. The initial configuration of the sleeve at its ends is indicated by dashed lines 99 and 101. The rings 98 and 100 have inner and outer surfaces of different axial lengths to provide surfaces 103 and 105 adjacent the initial configuration of the sleeve that slopes away from the sleeve from its outer to inner surface. The spaces 107 and 109 provided between the initial ends of the sleeve and the sloping surfaces 103 and 105 are such as to be filled by the beads of plastic 92 and 94 of FIG. 7.

The rings 98 and 100 are provided with notches 111 and 113 on their outer surfaces to accommodate turned-in rims 115 and 117 of heater 96 which hold the rings 98 and 100 in place. The rings and heater may be split members so that, if desired, they may be removed after completion of the splice.

The rings are preferably fabricated from a phenolic resin which is essentially not heated by the heater 96, the nature of the material and area of contact between heater and rings relative to the volume of the rings being such that the rings are essentially not heated. As a result the plastic of the sleeve stops when it hits the relatively cool rings and the bevel is formed.

Not only is the finished product more pleasing in appearance than with straight sides, but also the bevel provides a transition that greatly reduces the probability of cracking of the pipe at the edge of the sleeve.

There are advantages to using an external heater and having it remain as a permanent part of the structure. If left in place it reinforces the joint, helps location of a joint by a metal detector and it helps shield the joint from the environment.

The provision of a coil for induction heating of a heater can take various forms. The coil can be wound directly on the sleeve or heater if an external heater is employed, the coil can be in the form of a clam shell like structure as illustrated in FIG. 3 of International Publication No. WO 80/02124 or the heater can be incorporated in a clam shell like device as illustrated in FIG. 8 of International Publication No. WO 84/02098.

The use of an induction coil to energize a high mu material in a temperature self regulating heater is disclosed in U.S. Pat. No. 4,839,501 and skin effect heating by ohmic connection to such a system is disclosed in U.S. Pat. No. 4,256,945.

The frequency of energization of the coil or heater is in the radio frequency range and is preferably in the range of 25 KHz to 50 MHz, 13.56 MHz usually being employed by the assignee of the present invention. The lower frequency power supplies have the advantage of substantially lower cost and a requirement of large volume of magnetic material thereby increasing the strength of the joint and the ability to detect a buried pipe.

It should be noted that the invention is not limited to use of a cylindrical sleeve and other configurations such as ovals, ellipses, squares, rectangles and even some irregular shapes may be joined. The term "sleeve" is used herein to encompass all of these.

It should be noted that in all of the embodiments disclosed, no heater material is located between the sleeve and the members to be joined. The reason is that cracks can originate at the interface if sharp edges are in such a location.

Initially it is to be stated that the present system was designed especially for use in gas pipe systems wherein integrity of the joints is essential. Such specific use however does not negate the use of the system for joining plastic pipes in other fields including the chemical field, other pipeline industries and even large scale plumbing installations. Also, the joining system of this invention is not limited to pipes but may be employed wherever an excellent bond between two plastic surfaces is desired.

Many variations and modifications of the above-described embodiments are within the ordinary skill of the skilled artisan in this art, without departing from the scope of the invention. Accordingly, those modifications and embodiments are intended to fall within the scope of the invention as defined by the following claims.

We claim:

1. A structure for joining plastic members comprising
a sleeve of non-conductive material that is fusible with at least one plastic member to which it is to be joined,
said sleeve having an internal dimension and length such as to directly contact and snugly enclose a length of the member to which it is to be joined, and
means substantially separate from said length of contact of said sleeve with said member having a heat generating capacity to heat the sleeve and the member to be joined to their fusion temperatures whereby an extensive region of said enclosed length of the member and the sleeve to be joined are fused to one another,
said means including high mu material having a Curie temperature above the fusion temperature of but below the degradation temperature of the sleeve and of the member to be joined.

2. A structure according to claim 1 wherein said high mu material is embedded in said sleeve.

3. A structure according to claim 1 or claim 2 wherein
said means includes independently heated high mu materials for heating each of the members to be joined and the regions of the sleeve adjacent to such members.

4. A structure according to claim 3 wherein
said independently heated high mu materials have different Curie temperatures.

5. A structure according to claim 2 wherein
said high mu material is corrugated with ridges extending transverse to the length of said sleeve.

6. A structure according to claim 2 wherein
said high mu material is in the form of independent rings.

7. A structure according to claim 2 wherein
said high mu material constitutes independent bands of the high mu material.

8. An apparatus according to claims 1 or 2 wherein
said high mu material is a band extending a majority of the length of said sleeve.

9. A structure for joining plastic members according to claim 1 or claim 2 further comprising
a non-magnetic electrically conductive member surrounding said high mu material.

10. An apparatus according to claim 1 wherein
said sleeve is a hollow cylinder.

11. An apparatus according to claim 1 further comprising
a pair of round plastic pipes to be joined,
said sleeve being a hollow cylindrical member having an inner diameter to snugly receive said pipes each along an uninterrupted, extended length of said sleeve,
said means for heating causing said sleeve to fuse with said pipes along the essentially uninterrupted length of said sleeve.

12. An apparatus according to claim 1 or claim 11 further comprising
a pair of end caps having regions that extend over and contact said sleeve and have inwardly extending skirts for contacting the member to be joined to adjacent ends of said sleeve.
said regions of said end caps having on the surface adjacent said sleeve said high mu material.

13. An apparatus according to claim 12 wherein
the Curie temperature of said high mu materials on said end caps are different from one another.

14. An apparatus according to claim 1 wherein
said means for heating is a band of high mu material disposed about and in contact with said sleeve, and further means for raising the temperature of said cylinder to its effective Curie temperature.

15. An apparatus according to claim 14 further comprising
means disposed adjacent the ends of said sleeve to form beveled edges out of plastic of the sleeve that upon heating expands along the length of the plastic members to be joined.

16. An apparatus according to claim 1 or claim 2 or claim 11 or claim 14 wherein said means further includes
a coil for subjecting said high mu material to a high frequency magnetic field.

17. A structure according to claim 1 wherein said means comprises
a plurality of individual rings circular in cross section,
each of said rings lying in a plane perpendicular to the length of said sleeve and tangential to the inner surface of said sleeve.

18. A structure for joining plastic members according to claim 1 further comprising
a constant current source to produce heating of the sleeve.

19. A structure according to claim 1, wherein said sleeve and said plastic member having different fusion temperatures.

20. A structure for joining a first member to a second member wherein
said members have extended surfaces of a common configuration in contact with and to be fused to one another,
means for maintaining said extended surfaces in essentially uninterrupted contact with one another,
means substantially separate from a length of contact between said members having a heat generating capacity to heat said members to be joined to their fusion temperatures,
said means for heating including high mu material having a Curie temperature sufficient to cause fusion of said member but below damage temperature of the material of the members,
said high mu material being embedded in one of said members.

21. A structure according to claim 20 wherein
said first member is a sleeve surrounding said second member.

22. The method of joining two plastic members comprising
locating a first member such as to enclose adjacent, essentially uninterrupted lengths of the plastic members to be joined,
fusing the first member to the plastic members be energizing a coil to induce heating currents in a high mu material in thermal contact substantially only with the first member to raise the temperatures of all said members to their respective fusion temperatures, and
selecting the Curie temperature of the high mu material to be above the fusion temperature but below the damage temperature of the plastic members.

23. The method according to claim 22 comprising.
locating a high mu material about the member, and
heating the high mu material to approximately its effective Curie temperature.

24. The method according to claim 23 further comprising
providing outwardly sloping surfaces adjacent the ends of the member to provide elongated beveled edges on the member when fused to the members to be joined.

25. The method according to claim 22 further comprising the step of
forming the high mu material as a member circumferentially closed upon itself.

26. The method according to claim 22 further comprising the step of
embedding the high mu material in at least one of the members.

27. The method according to claim 22 further comprising the step of
forming the high mu materials as a corrugated member.

28. An electric fusion coupling which connects members to be connected which are made of resins of different melting temperatures comprising
 a first member having a first surface,
 a second member having a surface to be joined to said first surface,
 said members having different fusion temperatures,
 a ferromagnetic heater substantially spaced from said surfaces for heating both of said surfaces,
 said ferromagnetic heater having a Curie temperature above the fusion temperature of both said members.

* * * * *